US009787417B2

United States Patent
Xiao et al.

(10) Patent No.: US 9,787,417 B2
(45) Date of Patent: Oct. 10, 2017

(54) DATA TRANSMISSION METHOD, DEVICE, AND SYSTEM

(71) Applicant: HUAWEI TECHNOLOGIES CO., LTD., Shenzhen (CN)

(72) Inventors: Shengjin Xiao, Beijing (CN); Xiaohu Li, Beijing (CN); Hao Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 142 days.

(21) Appl. No.: 14/753,516

(22) Filed: Jun. 29, 2015

(65) Prior Publication Data

US 2015/0304060 A1 Oct. 22, 2015

Related U.S. Application Data

(63) Continuation of application No. PCT/CN2013/088700, filed on Dec. 5, 2013.

(30) Foreign Application Priority Data

Dec. 31, 2012 (CN) .......................... 2012 1 0593376

(51) Int. Cl.
*H04L 12/64* (2006.01)
*H04L 12/721* (2013.01)
(Continued)

(52) U.S. Cl.
CPC .......... *H04J 3/065* (2013.01); *H04L 12/6418* (2013.01); *H04L 45/68* (2013.01); *H04J 3/1617* (2013.01); *H04J 2203/0082* (2013.01)

(58) Field of Classification Search
CPC ........ H04J 3/065; H04J 3/0632; H04J 3/0658; H04J 3/0667; H04J 3/1617; H04L 47/283; H04L 12/6418; H04L 45/68
See application file for complete search history.

(56) References Cited

U.S. PATENT DOCUMENTS

| 7,564,876 B2 | 7/2009 | Le Sauze et al. |
| 8,509,114 B1 * | 8/2013 | Szajdecki ................ H04J 3/22 370/254 |

(Continued)

FOREIGN PATENT DOCUMENTS

| CN | 101188469 A | 5/2008 |
| CN | 101227381 A | 7/2008 |

(Continued)

OTHER PUBLICATIONS

European Examination Report dated Nov. 23, 2015 in related European Patent Application No. 11755712.4 (5 pages).

(Continued)

*Primary Examiner* — Ayaz Sheikh
*Assistant Examiner* — Debebe Asefa
(74) *Attorney, Agent, or Firm* — Staas & Halsey LLP

(57) ABSTRACT

Embodiments of the present application disclose a data transmission method, device, and system, and belong to the field of communications technologies. The method includes: receiving and temporarily storing, by a first node device, a designated service group sent by a second node device; and when the first node device needs to forward multiple SAToP or CESoPSN service packets in the temporarily stored designated service group, determining, by the first node device, whether an asynchronous SAToP or CESoPSN service packet exists in the designated service group, and if yes, acquiring, by the first node device, an adjustment value for the asynchronous SAToP or CESoPSN service packet according to a preset rule, and adjusting the asynchronous SAToP or CESoPSN service packet according to the adjustment value, so that the multiple SAToP or CESoPSN service packets in the designated service group are transmitted synchronously.

4 Claims, 8 Drawing Sheets

(51) Int. Cl.
*H04J 3/16* (2006.01)
*H04J 3/06* (2006.01)

(56) References Cited

U.S. PATENT DOCUMENTS

| | | |
|---|---|---|
| 2003/0021287 A1 | 1/2003 | Lee et al. |
| 2008/0298345 A1 | 12/2008 | Hadzie et al. |
| 2010/0284397 A1 | 11/2010 | Poulin et al. |
| 2013/0028272 A1* | 1/2013 | Tohda .................. H04J 3/0632 370/516 |

FOREIGN PATENT DOCUMENTS

| | | |
|---|---|---|
| CN | 102014431 A | 4/2011 |
| CN | 102457441 A | 5/2012 |
| CN | 103117846 A | 5/2013 |
| WO | WO 2010/052028 A1 | 5/2010 |
| WO | WO 2014/101644 A1 | 3/2014 |

OTHER PUBLICATIONS

Extended European Search Report dated Nov. 20, 2015 in corresponding European Patent Application No. 13868238.0 (12 pages).

"*TDM Circuit Emulation Service over Packet Switched Network (CESoPSN)*"; A. Vainshtein; Network Working Group; Jun. 2003 (39 pages).

"*Structure-Agnostic Time Division Multiplexing (TDM) over Packet (SAToP)*"; A. Vainshtein; Axerra Networks; Network Working Group; RAD Data Communications; Jun. 2006 (27 pages).

"*Structure-Aware Time Division Multiplexed (TDM) Circuit Emulation Service over Packet Switched Network (CESoPSN)*"; A. Vainshtein; Axerra Networks; Overture Networks; Dec. 2007 (38 pages).

"*Adaptive Network Access with 100 Gb/s Ethernet by Packet-based Lane Bundling*"; Kenji Hisadome; NTT Network Innovation Laboratories; OSA/OFC/NFOEC 2011 (3 pages).

International Search Report and Written Opinion (Forms PCT/ISA/210, PCT/ISA/220 and PCT/ISA/237) dated Dec. 5, 2013 in corresponding International Application No. PCT/CN2013/088700; (12 pages).

Chinese Office Action dated Apr. 3, 2015 in corresponding Chinese Patent Application No. 201210593376.9 (8 pages).

International Search Report dated Feb. 27, 2014 in corresponding international application PCT/CN2013/088700 (2 pages) (2 pages English Translation).

\* cited by examiner

DATA TRANSMISSION METHOD, DEVICE, AND SYSTEM

CROSS-REFERENCE TO RELATED APPLICATIONS

This application is a continuation of International Application No. PCT/CN2013/088700, filed on Dec. 5, 2013, which claims priority to Chinese Patent Application No. 201210593376.9, filed on Dec. 31, 2012, both of which are hereby incorporated by reference in their entireties.

TECHNICAL FIELD

The present application relates to the field of communications technologies, and in particular, to a data transmission method, device, and system.

BACKGROUND

With the development of communications technologies, many existing networks are upgraded. For example, an MSTP (Multi-Service Transfer Platform, SDH-based multi-service transfer platform) is migrated to SAToP (Structure-Agnostic Time Division Multiplexing (TDM) over Packet) or CESoPSN (Structure-Aware Time Division Multiplexed (TDM) Circuit Emulation Service over Packet Switched Network). In a process of migration from an MSTP network to a SAToP or CESoPSN network, a SAToP or CESoPSN service is generally used to transparently transmit an ML-PPP (PPP Multilink Protocol, PPP Multilink Protocol) or IMA (Inverse Multiplexing for ATM, inverse multiplexing for ATM) service, so that real-timeliness between multiple E1s or T1s (physical interface) in an original MSTP network base station is guaranteed, and a case of inconsistent service delays between E1s or T1s does not occur. However, in a scenario of migration from MSTP to SAToP or CESoPSN, a SAToP or CESoPSN service is performed on each E1 or T1, and data is separately transmitted on each E1 or T1 by using a different SAToP or CESoPSN service. However, because of a probable difference between paths of the SAToP or CESoPSN service or non-real-timeliness of an IP (Internet Protocol, Internet Protocol) network, delay differences exist in service transmission between multiple E1s and T1s. If a base station or BSC (Base Station Controller, base station controller) has a bundled service of multiple E1 or T1 services, because of the delay differences between multiple SAToP or CESoPSN services, a disorder occurs on the base station or BSC, eventually resulting in a large amount of packet loss.

In an solution in the prior art, in a scenario of migration of an MSTP to SAToP or CESoPSN, a BSC or base station can only passively accept generation of a delay between services, and when the delay is excessively long, packet loss occurs or a link is tore down from a bundling group, resulting in a failure of data transmission.

SUMMARY

In order to solve a problem that a delay difference exists between multiple SAToP or CESoPSN services in a scenario of migration to a SAToP or CESoPSN network, embodiments of the present application provide a data transmission method, device, and system. The technical solutions are as follows:

According to a first aspect, a data transmission method is provided, where the method includes: receiving and temporarily storing, by a first node device, a designated service group sent by a second node device, where the first node device and the second node device are two different node devices in a network, the designated service group includes multiple SAToP or CESoPSN service packets, and the designated service group is used to manage a timestamp or a sequence number of each SAToP or CESoPSN service packet; and when the first node device needs to forward the multiple SAToP or CESoPSN service packets in the temporarily stored designated service group, determining, by the first node device, whether an asynchronous SAToP or CESoPSN service packet exists in the designated service group, and if yes, acquiring, by the first node device, an adjustment value for the asynchronous SAToP or CESoPSN service packet according to a preset rule, and adjusting the asynchronous SAToP or CESoPSN service packet according to the adjustment value, so that the multiple SAToP or CESoPSN service packets in the designated service group are transmitted synchronously.

In a first possible implementation manner of the first aspect, the determining, by the first node device, whether an asynchronous SAToP or CESoPSN service packet exists in the designated service group includes:

parsing, by the first node device, each SAToP or CESoPSN service packet in the designated service group, to acquire the sequence number of each SAToP or CESoPSN service packet;

acquiring, by the first node device, a reference sequence number according to the sequence number of each SAToP or CESoPSN service packet; and determining, by the first node device, whether the sequence number of each SAToP or CESoPSN service packet is the same as the reference sequence number, and if not, determining a SAToP or CESoPSN service packet whose sequence number is different from the reference sequence number as the asynchronous SAToP or CESoPSN service packet in the designated service group.

In a first possible manner in the first possible implementation manner of the first aspect, the acquiring, by the first node device, an adjustment value for the asynchronous SAToP or CESoPSN service packet according to a preset rule, and adjusting the asynchronous SAToP or CESoPSN service packet according to the adjustment value includes:

acquiring, by the first node device, a difference obtained by subtracting the reference sequence number from the sequence number of the asynchronous SAToP or CESoPSN service packet, and obtaining the adjustment value for the asynchronous SAToP or CESoPSN service packet according to the difference; and when the difference is a negative number, discarding, by the first node device, a packet whose quantity is the adjustment value from the asynchronous SAToP or CESoPSN service packet; or when the difference is a positive number, inserting, by the first node device, an idle packet whose quantity is the adjustment value to the asynchronous SAToP or CESoPSN service packet.

In a second possible implementation manner of the first aspect, the determining, by the first node device, whether an asynchronous SAToP or CESoPSN service packet exists in the designated service group includes:

parsing, by the first node device, each SAToP or CESoPSN service packet in the designated service group, to acquire timestamp information of each SAToP or CESoPSN service packet;

acquiring, by the first node device, reference timestamp information according to the timestamp information of each SAToP or CESoPSN service packet; and determining, by the first node device, whether the timestamp information of each SAToP or CESoPSN service packet matches with the reference timestamp information, and if not, determining a SAToP or CESoPSN service packet whose timestamp information is different from the reference timestamp information as the asynchronous SAToP or CESoPSN service packet in the designated service group.

In a first possible manner in the second possible implementation manner of the first aspect, the acquiring, by the first node device, an adjustment value for the asynchronous SAToP or CESoPSN service packet according to a preset rule, and adjusting the asynchronous SAToP or CESoPSN service packet according to the adjustment value includes:

acquiring, by the first node device, a difference obtained by subtracting the reference timestamp information from the timestamp information of the asynchronous SAToP or CESoPSN service packet, and obtaining the adjustment value for the asynchronous SAToP or CESoPSN service packet according to the difference; and when the difference is a positive number, discarding, by the first node device, a packet whose quantity is the adjustment value from the asynchronous SAToP or CESoPSN service packet; or when the difference is a negative number, inserting, by the first node device, an idle packet whose quantity is the adjustment value to the asynchronous SAToP or CESoPSN service packet.

According to a second aspect, a node device is provided, including:

a receiving module, configured to receive and temporarily store a designated service group sent by a second node device, where the designated service group includes multiple SAToP or CESoPSN service packets, and the designated service group is used to manage a timestamp or a sequence number of each SAToP or CESoPSN service packet together; and a determining module, configured to: when the first node device needs to forward the multiple SAToP or CESoPSN service packets in the designated service group temporarily stored by the receiving module, determine whether an asynchronous SAToP or CESoPSN service packet exists in the designated service group, and if yes, acquire an adjustment value for the asynchronous SAToP or CESoPSN service packet according to a preset rule, and adjust the asynchronous SAToP or CESoPSN service packet according to the adjustment value, so that the multiple SAToP or CESoPSN service packets in the designated service group are transmitted synchronously.

In a first possible implementation manner of the second aspect, the determining module includes:

a first parsing unit, configured to parse each SAToP or CESoPSN service packet in the designated service group, to acquire the sequence number of each SAToP or CESoPSN service packet;

a first acquiring unit, configured to acquire a reference sequence number according to the sequence number of each SAToP or CESoPSN service packet obtained through parsing by the first parsing unit; and a first determining unit, configured to determine whether the sequence number of each SAToP or CESoPSN service packet is the same as the reference sequence number acquired by the first acquiring unit, and if not, determine a SAToP or CESoPSN service packet whose sequence number is different from the reference sequence number as the asynchronous SAToP or CESoPSN service packet in the designated service group.

In a first possible manner in the first possible implementation manner of the second aspect, the determining module includes:

a third acquiring unit, configured to acquire a difference obtained by subtracting the reference sequence number acquired by the first acquiring unit from the sequence number of the asynchronous SAToP or CESoPSN service packet, and obtain the adjustment value for the asynchronous SAToP or CESoPSN service packet according to the difference; and a first adjusting unit, configured to: when the difference is a negative number, discard a packet whose quantity is the adjustment value from the asynchronous SAToP or CESoPSN service packet; or when the difference is a positive number, insert an idle packet whose quantity is the adjustment value to the asynchronous SAToP or CESoPSN service packet.

In a second possible implementation manner of the second aspect, the determining module includes:

a second parsing unit, configured to parse each SAToP or CESoPSN service packet in the designated service group, to acquire timestamp information of each SAToP or CESoPSN service packet;

a fourth acquiring unit, configured to acquire reference timestamp information according to the timestamp information of each SAToP or CESoPSN service packet acquired by the second parsing unit; and a second determining unit, configured to determine whether the timestamp information of each SAToP or CESoPSN service packet is the same as the reference timestamp information acquired by the fourth acquiring unit, and if not, determine a SAToP or CESoPSN service packet whose timestamp information is different from the reference timestamp information as the asynchronous SAToP or CESoPSN service packet in the designated service group.

In a first possible manner in the second possible implementation manner of the second aspect, the determining module includes:

a fifth acquiring unit, configured to acquire a difference obtained by subtracting the reference timestamp information from the timestamp information of the asynchronous SAToP or CESoPSN service packet, and obtain the adjustment value for the asynchronous SAToP or CESoPSN service according to the difference; and a second adjusting unit, configured to: when the difference is a positive number, discard a packet whose quantity is the adjustment value from the asynchronous SAToP or CESoPSN service packet; or when the difference is a negative number, insert an idle packet whose quantity is the adjustment value to the asynchronous SAToP or CESoPSN service packet.

According to a third aspect, a data transmission system is provided, where the system includes the node device described above and a second node device, where the second node device is configured to bind multiple SAToP or CESoPSN service packets to the designated service group and send the designated service group to the node device.

The beneficial effects brought by the technical solutions provided in the embodiments of the present application are: A first node device receives and temporarily stores a designated service group sent by a second node device; and when the first node device needs to forward multiple SAToP or CESoPSN service packets in the temporarily stored designated service group, the first node device determines whether an asynchronous SAToP or CESoPSN service packet exists in the designated service group; and if yes, the first node device acquires an adjustment value for the asynchronous SAToP or CESoPSN service packet according to a preset rule, and adjusts the asynchronous SAToP or CESoPSN service packet according to the adjustment value, so that the multiple SAToP or CESoPSN service packets in the designated service group are transmitted synchronously. Multiple SAToP or CESoPSN service packets in a designated service group are managed together, which solves a delay problem that occurs when a first node device sends the multiple SAToP or CESoPSN services.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application, and a person of ordinary skill in the art may still derive other drawings from these accompanying drawings without creative efforts.

DESCRIPTION OF EMBODIMENTS

To make the objectives, technical solutions, and advantages of the present application clearer, the following further describes the embodiments of the present application in detail with reference to the accompanying drawings.

In the following embodiments, if a sequence number is involved, and a difference between a sequence number of a SAToP or CESoPSN service packet and a reference sequence number is greater than a difference obtained by subtracting a preset value from a reverse modulus, reversal processing is performed, that is, the reverse modulus is added to an existing difference to obtain a correct difference.

Figure 1:
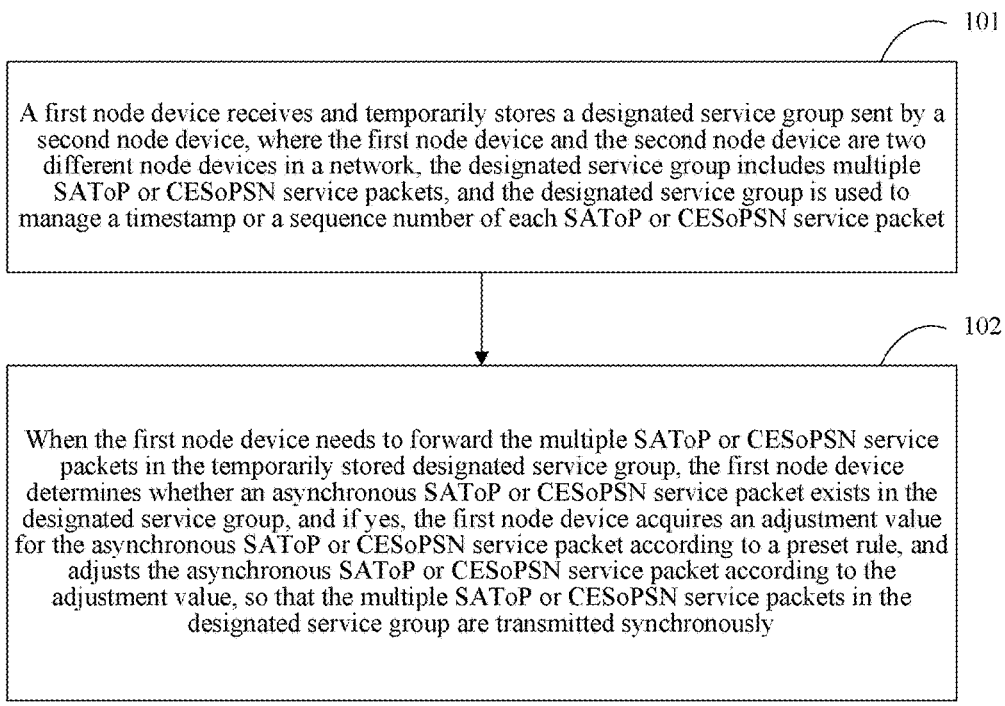
FIG. 1 is a flowchart of a data transmission method according to an embodiment of the present application.

Referring to FIG. 1, a data transmission method is provided in this embodiment, including:

101: A first node device receives and temporarily stores a designated service group sent by a second node device, where the first node device and the second node device are two different node devices in a network, the designated service group includes multiple SAToP or CESoPSN service packets, and the designated service group is used to manage a timestamp or a sequence number of each SAToP or CESoPSN service packet.

102: When the first node device needs to forward the multiple SAToP or CESoPSN service packets in the temporarily stored designated service group, the first node device determines whether an asynchronous SAToP or CESoPSN service packet exists in the designated service group, and if yes, the first node device acquires an adjustment value for the asynchronous SAToP or CESoPSN service packet according to a preset rule, and adjusts the asynchronous SAToP or CESoPSN service packet according to the adjustment value, so that the multiple SAToP or CESoPSN service packets in the designated service group are transmitted synchronously.

The beneficial effects of this embodiment are: A first node device receives and temporarily stores a designated service group sent by a second node device; and when the first node device needs to forward multiple SAToP or CESoPSN service packets in the temporarily stored designated service group, the first node device determines whether an asynchronous SAToP or CESoPSN service packet exists in the designated service group, and if yes, the first node device acquires an adjustment value for the asynchronous SAToP or CESoPSN service packet according to a preset rule, and adjusts the asynchronous SAToP or CESoPSN service packet according to the adjustment value, so that the multiple SAToP or CESoPSN service packets in the designated service group are transmitted synchronously. Multiple SAToP or CESoPSN service packets in a designated service group are managed, which resolves a delay problem that occurs when a first node device sends the multiple SAToP or CESoPSN services.

Figure 2:
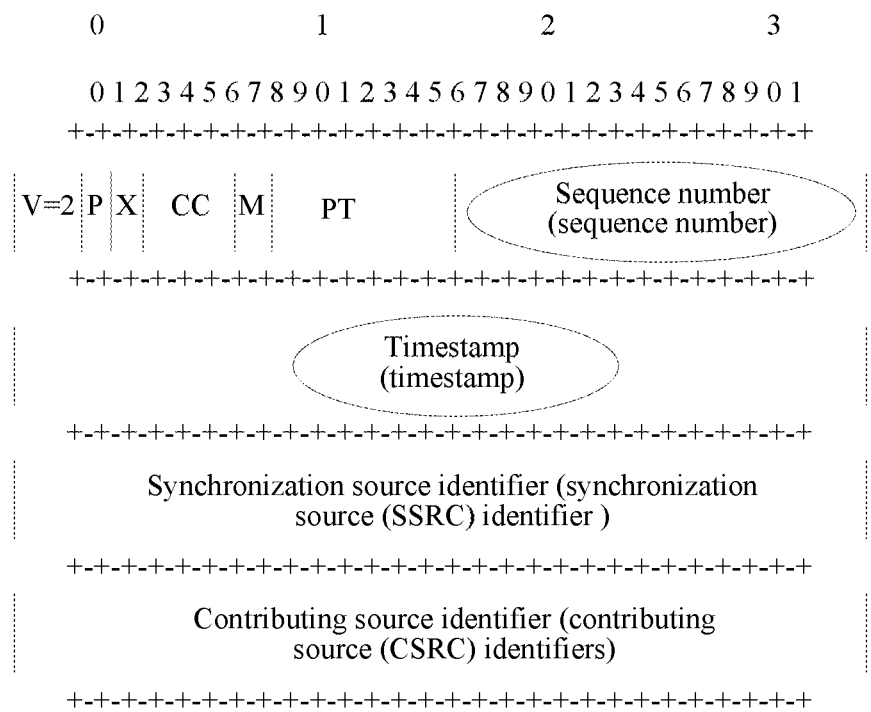
FIG. 2 is a schematic diagram of an overhead field according to an embodiment of the present application.

A data transmission method is provided in an embodiment of the present application. In a scenario of migration from MSTP to SAToP or CESoPSN, a SAToP or CESoPSN service group is introduced, multiple SAToP or CESoPSN service packets are bound to a group, and a sequence number or timestamp information of each SAToP or CESoPSN service packet in the group is managed by using a service group, so that a transmission delay between links can be adjusted at a SAToP or CESoPSN service outlet according to a difference of the timestamp information or the sequence number, so as to achieve an objective of time synchronization of all links. Optionally, an overhead field in the current protocols RFC 4553 and RFC 5086 is used in a designated service group to implement management on multiple SAToP or CESoPSN services. An overhead field shown in FIG. 2 includes a sequence number (sequence number), and optionally, may also include a timestamp (timestamp), a Synchronization Source (SSRC) Identifier (synchronization source identifier), and a Contributing source (CSRC) Identifier (contributing source identifier). This part is similar to the prior art, and is not repeatedly described in this embodiment.

Figure 3:
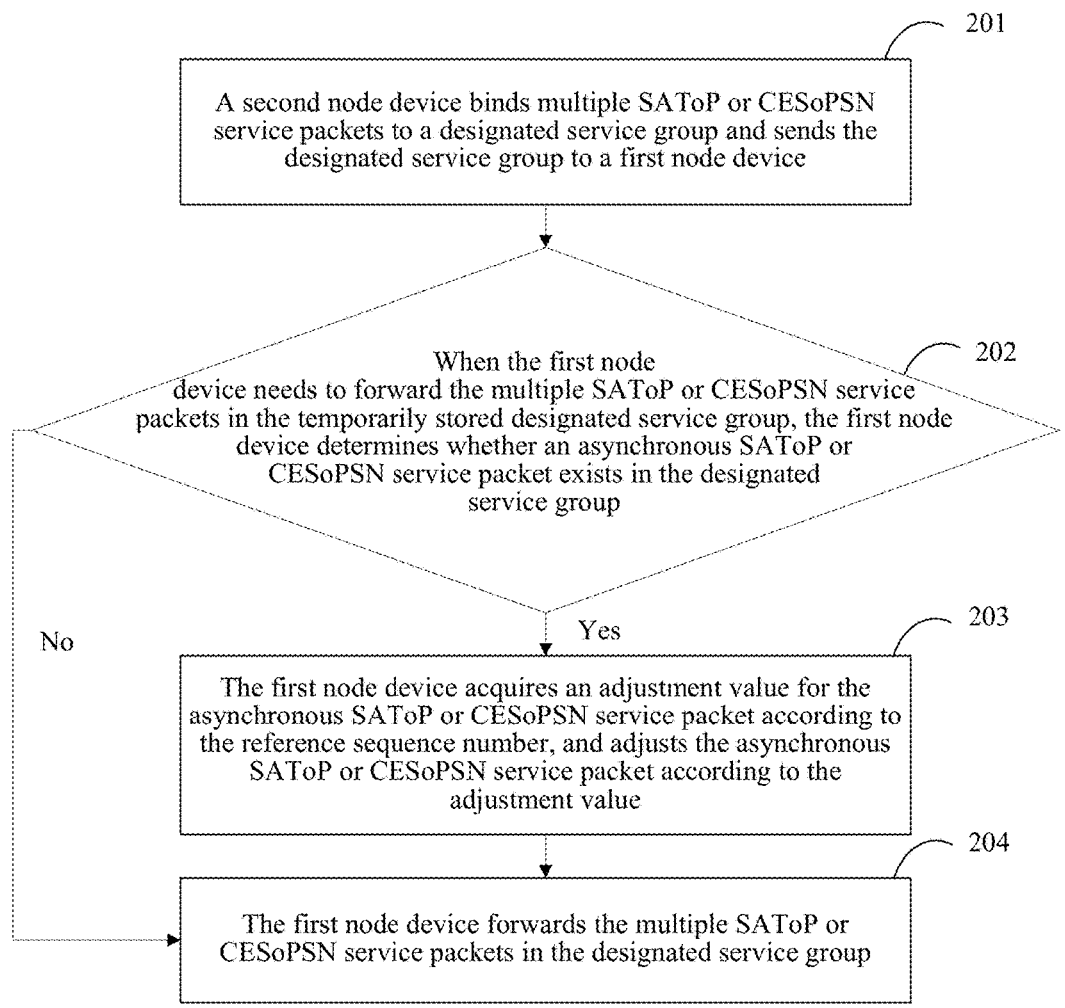
FIG. 3 is a flowchart of a data transmission method according to an embodiment of the present application.

Referring to FIG. 3, when an overhead field includes only a sequence number, a method for resolving a link time problem by using a sequence number in a packet is provided in this embodiment, and a specific procedure of the method includes:

201: A second node device binds multiple SAToP or CESoPSN service packets to a designated service group and sends the designated service group to a first node device.

In this embodiment, the designated service group refers to a SAToP or CESoPSN service group and includes multiple SAToP or CESoPSN service packets. The designated service group manages a timestamp or a sequence number of each SAToP or CESoPSN service packet.

In this embodiment, the first node device and the second node device are two different node devices in a network. A transmission rule for a SAToP or CESoPSN service group is configured in advance in the first node device and the second node device, that is, synchronization of timestamps or sequence numbers is kept for multiple SAToP or CESoPSN service packets in one group. When a case of asynchronization occurs, an asynchronous SAToP or CESoPSN service packet is adjusted.

When IMA or MLPPP services are performed at two ends of a first node device and a second node device, the multiple SAToP or CESoPSN service packets corresponding to multiple links in an IMA or MLPPP group are bound to the designated service group, and sequence numbers of the multiple SAToP or CESoPSN service packets are managed in the designated service group.

202: When the first node device needs to forward the multiple SAToP or CESoPSN service packets in the temporarily stored designated service group, the first node device determines whether an asynchronous SAToP or CESoPSN service packet exists in the designated service group, and if yes, perform step 203, if not, perform step 204.

In this step, in order to reduce a delay between services, after receiving the designated service group sent by the second node device, the first node device temporarily stores the multiple SAToP or CESoPSN service packets in the designated service group, and when the multiple SAToP or CESoPSN service packets in the designated service group need to be forwarded, that is, when the temporarily stored packets meet a forwarding condition, parses each SAToP or CESoPSN service in the designated service group to obtain a sequence number of the transmitted packet of each SAToP or CESoPSN service, and determines, according to the sequence number of the transmitted packet of each SAToP or CESoPSN service, whether an asynchronous SAToP or CESoPSN service exists in the designated service group. A specific manner for obtaining a sequence number in a packet through parsing is similar to that in the prior art, and is no longer described in this embodiment. The forwarding condition refers to a transmission pipeline configured by a user in an initial period when a service is established. The transmission pipeline is a threshold. Only when a quantity of packets temporarily stored in a transmission direction reaches the threshold, the first node device sends the packets. This part is similar to the prior art, and is no longer described in this embodiment.

Specifically, the determining, by the first node device, whether an asynchronous SAToP or CESoPSN service packet exists in the designated service group includes: parsing, by the first node device, each SAToP or CESoPSN service packet in the designated service group, to acquire the sequence number of each SAToP or CESoPSN service packet; acquiring, by the first node device, a reference sequence number according to the sequence number of each SAToP or CESoPSN service packet; and determining, by the first node device, whether the sequence number of each SAToP or CESoPSN service packet is the same as the reference sequence number, and if not, determining a SAToP or CESoPSN service packet whose sequence number is different from the reference sequence number as the asynchronous SAToP or CESoPSN service packet in the designated service group.

In this step, after the sequence number of each SAToP or CESoPSN service packet in the designated service group is acquired, the acquiring the reference sequence number according to the sequence number of each SAToP or CESoPSN service packet includes: calculating an average value of the sequence numbers of the packets of all the SAToP or CESoPSN services, and using the average value as the reference sequence number. Certainly, the reference sequence number may also be obtained by using other algorithms For example, when only one service packet in the packets of all SAToP or CESoPSN services has a sequence number different from that of the rest service packets, this service is determined as an asynchronous service, and the reference sequence number is the sequence number of the rest service packets other than the asynchronous service. An algorithm to be used is not specifically limited in this embodiment. After the reference sequence number is obtained, it is determined whether a transmitted sequence number of each SAToP or CESoPSN service matches with the reference sequence number. If a sequence number that does not match with the reference sequence number is found, this service is determined as the asynchronous SAToP or CESoPSN service in the designated service group, and a transmission link of the asynchronous SAToP or CESoPSN service is further adjusted. "Match" described in this embodiment refers to that: A difference is obtained by subtracting the reference sequence number from the sequence number of the transmitted packet of each SAToP or CESoPSN service, and an absolute value of the difference is less than a preset value, where, for example, the preset value may be 0.5.

203: The first node device acquires an adjustment value for the asynchronous SAToP or CESoPSN service packet according to the reference sequence number, and adjusts the asynchronous SAToP or CESoPSN service packet according to the adjustment value.

In this step, after determining the asynchronous SAToP or CESoPSN service packet, the first node device adjusts the packet of the SAToP or CESoPSN service, so that the packets of the SAToP or CESoPSN services in the designated group can be transmitted synchronously. Specifically, the acquiring, by the first node device, an adjustment value for the asynchronous SAToP or CESoPSN service packet according to a preset rule, and adjusting the asynchronous SAToP or CESoPSN service packet according to the adjustment value includes:

acquiring, by the first node device, a difference obtained by subtracting the reference sequence number from the sequence number of the asynchronous SAToP or CESoPSN service packet, and obtaining the adjustment value for the asynchronous SAToP or CESoPSN service packet according to the difference; and when the difference is a negative number, discarding, by the first node device, a packet whose quantity is the adjustment value from the asynchronous SAToP or CESoPSN service packet; or when the difference is a positive number, inserting, by the first node device, an idle packet whose quantity is the adjustment value to the asynchronous SAToP or CESoPSN service packet.

In this embodiment, if it is found that a sequence number of an asynchronous packet is greater than the reference sequence number, it indicates that a delay of a transmission link of the packet of the SAToP or CESoPSN service is less than a delay of a transmission link of another SAToP or CESoPSN service, and an idle packet whose quantity is the adjustment value are inserted in the link to make all links keep synchronous; and if it is found that a sequence number of an asynchronous packet is less than the reference sequence number, it indicates that a delay of a link that bears the packet is greater than a delay of another link, and in this case, a packet whose quantity is the adjustment value are discarded to keep all the links synchronous.

That the first node device obtains the adjustment value for the asynchronous SAToP or CESoPSN service packet according to the difference includes:

A difference is obtained by subtracting the reference sequence number from a transmitted sequence number of each SAToP or CESoPSN service. Divisor processing is performed on the difference according to a preset configuration rule or a preset algorithm to obtain the adjustment value, and the adjustment value is an integer. In this embodiment, the preset configuration rule is set in advance by an IP base station or a BSC, and specifically may be set according to a degree of acceptance of the BSC or base station for a service delay difference in a group, and is not specifically limited in this embodiment. The preset algorithm includes a rounding algorithm, or another method of divisor processing, and is not specifically limited in this embodiment.

Figure 4A:
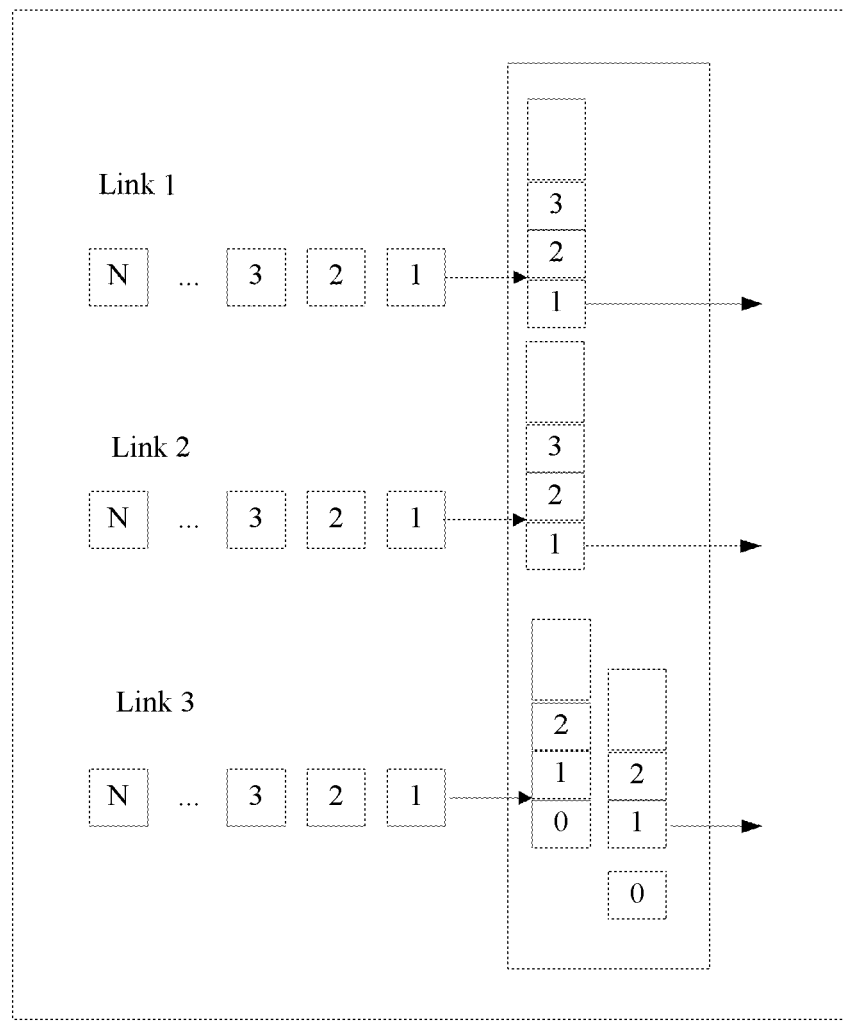
FIG. 4a is a schematic diagram of a type of packet transmission according to an embodiment of the present application.

In order to enable a person skilled in the art to understand the technical solutions provided in the present application more clearly, examples are given below:

As shown in FIG. 4a, the first node device receives a designated service group sent by the second node device, where the designated service group includes transmission links of three SAToP or CESoPSN services. When a transmission pipeline of the first node device reaches a transmission condition, a jitter buffer area (Jitter Buffer) determines whether the three services are synchronous. As can be seen from FIG. 4a, a sequence number of packets transmitted on a first link and a second link is 3, and a sequence number of a packet transmitted on a third link is 2. It can be seen that a delay of the third link is greater than that of the first link and the second link, and a time of a packet is delayed, so that the first not device actively discards one packet during transmission, and reduces the transmission pipeline by one packet, and therefore the packets transmitted on the three links are kept synchronous again. Alternatively, a reference sequence number, being an average value of sequence numbers of three service packets, is calculated to be 2.67, and an adjustment value for the third link is further calculated to be −0.67, which is a decimal number. Then, the adjustment value is obtained to be −1 according to a divisor processing principle, and the first node device actively discards one packet during transmission.

Figure 4B:
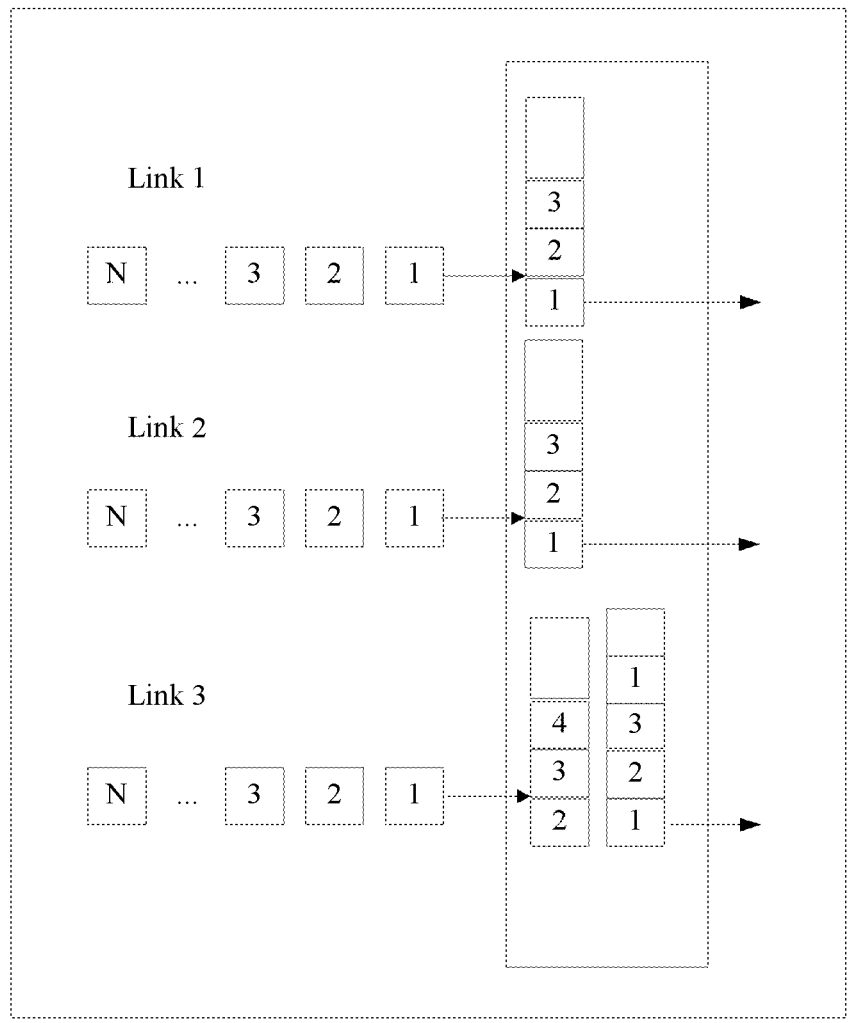
FIG. 4b is a schematic diagram of another type of packet transmission according to an embodiment of the present application.

As shown in FIG. 4b, a sequence number of packets transmitted on a first link and a second link is 3, and a sequence number of a packet transmitted on a third link is 4. It can be seen that a delay of the third link is less than that of the first link and the second link by transmission time of one packet, so that during transmission on the third link, the first node device actively transmits one idle packet, and increases the transmission pipeline by one idle packet. In this way, during transmission of a next packet, the three links are kept synchronous again. Alternatively, a reference sequence number, being an average value of sequence numbers of three service packets, is calculated to be 3.33, and an adjustment value for the third link is further calculated to be 0.67, which is a decimal number. Then, the adjustment value is obtained to be 1 according to a divisor processing principle, and the first node device actively inserts one idle packet during transmission.

In this embodiment, further, when an absolute value of the adjustment value is greater than a preset threshold, the first node device performs an operation of raising a link alarm, so as to notify another device in a SAToP or CESoPSN network of a link failure condition, so that a user can learn link failure information.

204: The first node device forwards the multiple SAToP or CESoPSN service packets in the designated service group.

In this embodiment, when the multiple SAToP or CESoPSN service packets in the designated service group are synchronous, the first node device forwards the multiple SAToP or CESoPSN service packets, so as to complete transmission of services.

The beneficial effects of this embodiment are: A first node device receives and temporarily stores a designated service group sent by a second node device; and when the first node device needs to forward the multiple SAToP or CESoPSN service packets in the temporarily stored designated service group, the first node device determines whether an asynchronous SAToP or CESoPSN service packet exists in the designated service group, and if yes, the first node device acquires an adjustment value for the asynchronous SAToP or CESoPSN service packet according to a preset rule, and adjusts the asynchronous SAToP or CESoPSN service packet according to the adjustment value, so that the multiple SAToP or CESoPSN service packets in the designated service group are transmitted synchronously. Adjustment on a link delay is implemented by using a sequence number in a packet, thereby solving a link delay problem, achieving seamless migration from an MSTP network to a SAToP or CESoPSN network, and reducing difficulty in network deployment.

Figure 5:
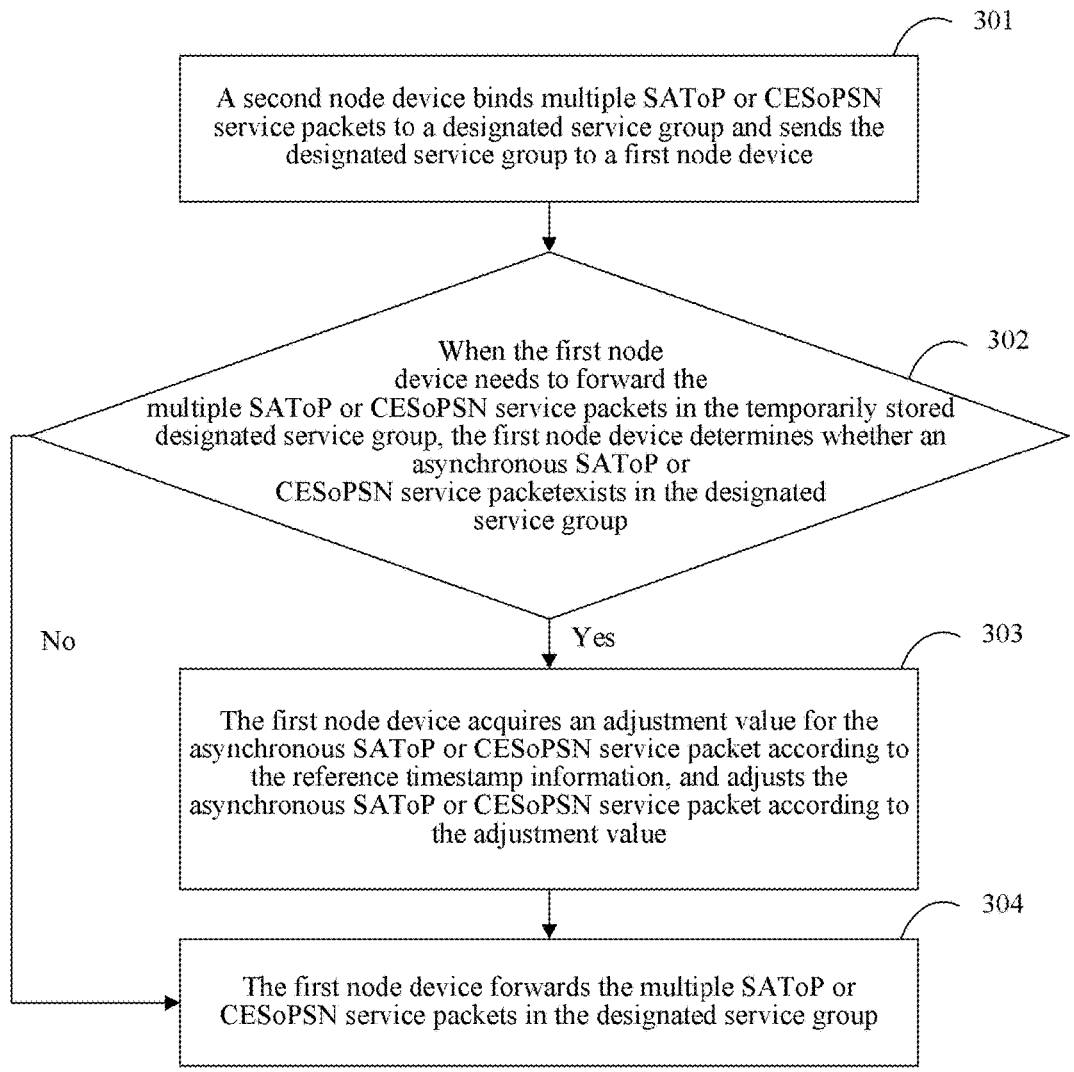
FIG. 5 is a flowchart of a data transmission method according to an embodiment of the present application.

An embodiment of the present application provides a data transmission method. Referring to FIG. 5, when an overhead field also includes timestamp information, a method for solving a link time problem by using timestamp information in a packet is provided in this embodiment, and a specific procedure of the method includes:

301: A second node device binds multiple SAToP or CESoPSN service packets to a designated service group and sends the designated service group to a first node device.

This step is similar to step 201 in the foregoing embodiment, and a difference is in that: When a second node device needs to transmit an IMA or MP service, the multiple SAToP or CESoPSN service packets are bound to the designated service group, and timestamps of the multiple SAToP or CESoPSN services are managed in the designated service group. When timestamp information is used, a header of an RTP (Real-time Transport Protocol, Real-time Transport Protocol) needs to be enabled. This part is similar to the prior art, and is no longer described in this embodiment.

302: When the first node device needs to forward the multiple SAToP or CESoPSN service packets in the temporarily stored designated service group, the first node device determines whether an asynchronous SAToP or CESoPSN service packet exists in the designated service group, and if yes, perform step 303, or if not, perform step 304.

In this step, after receiving the designated service group sent by the second node device, the first node device temporarily stores the multiple SAToP or CESoPSN service packets in the received designated service group, and when the multiple SAToP or CESoPSN services in the designated service group need to be forwarded, parses each SAToP or CESoPSN service in the service group to obtain timestamp information of the transmitted packet of each SAToP or CESoPSN service, that is, relative time of the packet. A specific manner for obtaining timestamp information in a packet through parsing is similar to the prior art, and is no longer described in this embodiment.

Specifically, the determining, by the first node device, whether an asynchronous SAToP or CESoPSN service packet exists in the designated service group includes: parsing, by the first node device, each SAToP or CESoPSN service packet in the designated service group, to acquire timestamp information of each SAToP or CESoPSN service packet; acquiring, by the first node device, reference timestamp information according to the timestamp information of each SAToP or CESoPSN service packet; and determining, by the first node device, whether the timestamp information of each SAToP or CESoPSN service packet matches with the reference timestamp information, and if not, determining a SAToP or CESoPSN service packet whose timestamp information does not match with the reference timestamp information as the asynchronous SAToP or CESoPSN service packet in the designated service group. "Match" described in this embodiment refers to that: A difference is obtained by subtracting the reference timestamp information from the timestamp information of each SAToP or CESoPSN service packet, and an absolute value of the difference is less than a preset value, where, for example, the preset value may be 0.5.

In this step, the acquiring, by the first node device, reference timestamp information according to the timestamp information of each SAToP or CESoPSN service packet includes: calculating an average value of the timestamp information of the packets of all the SAToP or CESoPSN services, and using the average value as the reference timestamp information. Certainly, the reference timestamp information may also be obtained by using other algorithms, which are not specifically limited in this embodiment. After the reference timestamp information is acquired, it is determined whether the timestamp information of each SAToP or CESoPSN service packet matches with the reference timestamp information. If a packet whose timestamp information does not match with the reference timestamp information is found, a packet transmission link of a service corresponding to the packet is determined as a transmission link of the asynchronous SAToP or CESoPSN service in the designated service group, and the transmission link of the SAToP or CESoPSN service is further adjusted.

303: The first node device acquires an adjustment value for the asynchronous SAToP or CESoPSN service packet according to the reference timestamp information, and adjusts the asynchronous SAToP or CESoPSN service packet according to the adjustment value.

In this step, after the first node device determines the asynchronous SAToP or CESoPSN service packet, the first node device adjusts the packet of the SAToP or CESoPSN service, so that the packets of the SAToP or CESoPSN services in the designated group can be transmitted synchronously. Specifically, the acquiring, by the first node device, an adjustment value for the asynchronous SAToP or CESoPSN service packet according to a preset rule, and adjusting the asynchronous SAToP or CESoPSN service packet according to the adjustment value includes:

acquiring, by the first node device, a difference obtained by subtracting the reference timestamp information from the timestamp information of the asynchronous SAToP or CESoPSN service packet, and obtaining the adjustment value for the asynchronous SAToP or CESoPSN service packet according to the difference; and when the difference is a positive number, discarding, by the first node device, a packet whose quantity is the adjustment value from the asynchronous SAToP or CESoPSN service packet; or when the difference is a negative number, inserting, by the first node device, an idle packet whose quantity is the adjustment value to the asynchronous SAToP or CESoPSN service packet.

In this embodiment, if it is found that the timestamp information of a link of the asynchronous SAToP or CESoPSN service is less than the reference timestamp information, it indicates that a delay of the transmission link of the SAToP or CESoPSN service is less than a delay of a transmission link of another SAToP or CESoPSN service, and corresponding idle packet is inserted in the link to keep all the links synchronous; and if it is found that timestamp information of a link of the asynchronous SAToP or CESoPSN service is greater than the reference timestamp information, it indicates that a delay of the link is greater than a delay of another link, and in this case, corresponding packet is discarded to keep all the links synchronous.

The obtaining, by the first node device, the adjustment value for the asynchronous SAToP or CESoPSN service packet according to the difference includes: obtaining the adjustment value by converting the difference. A conversion method may be: dividing the difference by a transmission time interval of the single packet, and performing divisor processing on the calculation result according to a preset algorithm or rule, so as to obtain the adjustment value being an integer. In this embodiment, a preset configuration rule is set in advance by an IP base station or a BSC, and specifically may be set according to a degree of acceptance of the BSC or base station for a service delay difference in a group, and is not specifically limited in this embodiment. The preset algorithm includes a rounding algorithm, or another method of divisor processing, and is not specifically limited in this embodiment.

In this embodiment, when an absolute value of the adjustment value is greater than a preset threshold, the first node device performs an operation of raising a link alarm, so as to notify another device in a SAToP or CESoPSN network of a link failure condition, so that a user can learn link failure information. A base station or BSC in a network may monitor link information in a manner of using third-party network management software or the like, and in a specific implementation process, which manner is used to monitor the link information is not specifically limited in this embodiment.

304: A first node device forwards the multiple SAToP or CESoPSN service packets in the designated service group.

In this embodiment, when the multiple SAToP or CESoPSN service packets in the designated service group are synchronous, the first node device forwards the multiple SAToP or CESoPSN service packets, so as to complete transmission of services.

The beneficial effects of this embodiment are: A first node device receives and temporarily stores a designated service group sent by a second node device; and when the first node device needs to forward multiple SAToP or CESoPSN service packets in the temporarily stored designated service group, the first node device determines whether an asynchronous SAToP or CESoPSN service packet exists in the designated service group, and if yes, the first node device acquires an adjustment value for the asynchronous SAToP or CESoPSN service packet according to a preset rule, and adjusts the asynchronous SAToP or CESoPSN service packet according to the adjustment value, so that the multiple SAToP or CESoPSN service packets in the designated service group are transmitted synchronously. Adjustment on a link delay is implemented by using timestamp information, thereby solving a link delay problem, achieving seamless migration from an MSTP network to a SAToP or CESoPSN network, and reducing difficulty in network deployment.

Figure 6:
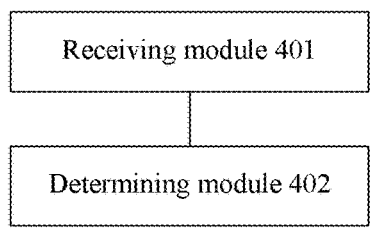
FIG. 6 is a schematic diagram of a node device according to an embodiment of the present application.

Referring to FIG. 6, this embodiment provides a node device 400, including: a receiving module 401 and a determining module 402.

The receiving module 401 is configured to receive and temporarily store a designated service group sent by a second node device, where the designated service group includes multiple SAToP or CESoPSN services, and the designated service group is used to manage a timestamp or a sequence number of each SAToP or CESoPSN service.

The determining module 402 is configured to: when the first node device needs to forward multiple SAToP or CESoPSN service packets in the designated service group temporarily stored by the receiving module 401, determine whether an asynchronous SAToP or CESoPSN service packet exists in the designated service group, and if yes, acquire an adjustment value for the asynchronous SAToP or CESoPSN service packet according to a preset rule, and adjust the asynchronous SAToP or CESoPSN service packet according to the adjustment value, so that the multiple SAToP or CESoPSN service packets in the designated service group are transmitted synchronously.

Figure 7:
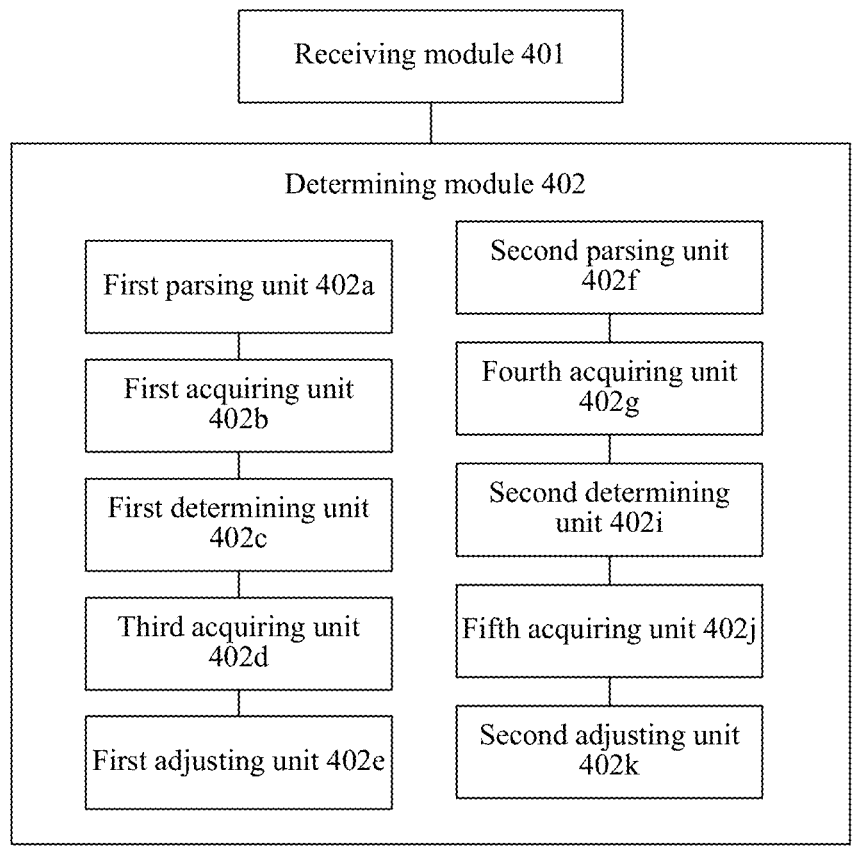
FIG. 7 is a schematic diagram of another node device according to an embodiment of the present application.

Referring to FIG. 7, optionally, the determining module 402 includes:

a first parsing unit 402a, configured to parse each SAToP or CESoPSN service packet in the designated service group, to acquire the sequence number of each SAToP or CESoPSN service packet;

a first acquiring unit 402b, configured to acquire a reference sequence number according to the sequence number of each SAToP or CESoPSN service packet obtained through parsing by the first parsing unit 402a; and a first determining unit 402c, configured to determine whether the sequence number of each SAToP or CESoPSN service packet matches with the reference sequence number acquired by the first acquiring unit 402b, and if not, determine a SAToP or CESoPSN service packet whose sequence number is different from the reference sequence number as the asynchronous SAToP or CESoPSN service packet in the designated service group. "Match" described in this embodiment refers to that: A difference is obtained by subtracting the reference sequence number from the sequence number of each SAToP or CESoPSN service packet, and an absolute value of the difference is less than a preset value, where, for example, the preset value may be 0.5.

Based on the reference sequence number acquired by the first acquiring unit 402b, referring to FIG. 7, correspondingly, the determining module 402 includes:

a third acquiring unit 402d, configured to acquire the adjustment value for the asynchronous SAToP or CESoPSN service packet, and may specifically be configured to subtract the reference sequence number acquired by the first acquiring unit from the sequence number of the asynchronous SAToP or CESoPSN service packet to obtain a difference, and obtain the adjustment value for the asynchronous SAToP or CESoPSN service packet according to the difference; and a first adjusting unit 402e, configured to: when the difference is a negative number, discard a packet whose quantity is the adjustment value from the asynchronous SAToP or CESoPSN service packet; or when the difference is a positive number, insert an idle packet whose quantity is the adjustment value to the asynchronous SAToP or CESoPSN service packet.

Optionally, referring to FIG. 7, the determining module 402 includes:

a second parsing unit 402f, configured to parse each SAToP or CESoPSN service packet in the designated service group, to acquire timestamp information of each SAToP or CESoPSN service packet;

a fourth acquiring unit 402g, configured to acquire reference timestamp information according to the timestamp information of each SAToP or CESoPSN service packet acquired by the second parsing unit 402f; and a second determining unit 402i, configured to determine whether the timestamp information of each SAToP or CESoPSN service packet matches with the reference timestamp information acquired by the fourth acquiring unit 402g, and if not, determine a SAToP or CESoPSN service packet whose timestamp information does not match with the reference timestamp information as the asynchronous SAToP or CESoPSN service packet in the designated service group. "Match" described in this embodiment refers to that: A difference is obtained by subtracting the reference timestamp information from the timestamp information of each SAToP or CESoPSN service packet, and an absolute value of the difference is less than a preset value, where, for example, the preset value may be 0.5.

Based on the reference timestamp information acquired by the fourth acquiring unit 402g, referring to FIG. 7, correspondingly, the determining module 402 includes:

a fifth acquiring unit 402j, configured to acquire the adjustment value for the asynchronous SAToP or CESoPSN service packet, and may specifically be configured to subtract the reference timestamp information from the timestamp information of the asynchronous SAToP or CESoPSN service packet to obtain a difference, and obtain the adjustment value for the asynchronous SAToP or CESoPSN service packet according to the difference; and a second adjusting unit 402k, configured to: when the difference is a positive number, discard a packet whose quantity is the adjustment value from the asynchronous SAToP or CESoPSN service packet; or when the difference is a negative number, insert an idle packet whose quantity is the adjustment value to the asynchronous SAToP or CESoPSN service packet.

The obtaining, by the first node device, the adjustment value for the asynchronous SAToP or CESoPSN service packet according to the difference includes: obtaining the adjustment value by converting the difference. A conversion method may be: dividing the difference by a transmission time interval of the single packet, and performing divisor processing on the calculation result according to a preset algorithm or rule, so as to obtain the adjustment value being an integer. The beneficial effects of this embodiment are: A first node device receives and temporarily stores a designated service group sent by a second node device; and when the first node device needs to forward multiple SAToP or CESoPSN service packets in the designated service group, the first node device determines whether an asynchronous SAToP or CESoPSN service packet exists in the designated service group, and if yes, the first node device acquires an adjustment value for the asynchronous SAToP or CESoPSN service packet according to a preset rule, and adjusts the asynchronous SAToP or CESoPSN service packet according to the adjustment value, so that the multiple SAToP or CESoPSN service packets in the designated service group are transmitted synchronously. Multiple SAToP or CESoPSN service packets in a designated service group are managed together, which resolves a delay problem that occurs when a first node device sends the multiple SAToP or CESoPSN services.

Figure 8:
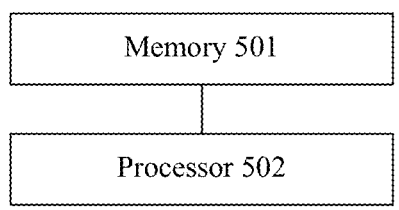
FIG. 8 is a schematic diagram of another node device according to an embodiment of the present application.

Referring to FIG. 8, this embodiment provides a node device 500, including: a memory 501 and a processor 502.

The memory 501 is configured to receive and temporarily store a designated service group sent by a second node device, where the first node device and the second node device are two different node devices in a network, the designated service group includes multiple SAToP or CESoPSN service packets, and the designated service group is used to manage a timestamp or a sequence number of each SAToP or CESoPSN service packet.

The processor 502 is configured to: when the multiple SAToP or CESoPSN service packets in the designated service group temporarily stored in the memory 501 need to be forwarded, determine whether an asynchronous SAToP or CESoPSN service packet exists in the designated service group, and if yes, acquire an adjustment value for the asynchronous SAToP or CESoPSN service packet according to a preset rule, and adjust the asynchronous SAToP or CESoPSN service packet according to the adjustment value, so that the multiple SAToP or CESoPSN service packets in the designated service group are transmitted synchronously.

Optionally, the determining whether an asynchronous SAToP or CESoPSN service packet exists in the designated service group includes:

parsing each SAToP or CESoPSN service packet in the designated service group, to acquire the sequence number of each SAToP or CESoPSN service packet;

acquiring a reference sequence number according to the sequence number of each SAToP or CESoPSN service packet; and determining whether the sequence number of each SAToP or CESoPSN service packet matches with the reference sequence number, and if not, determining a SAToP or CESoPSN service packet whose sequence number does not match with the reference sequence number as the asynchronous SAToP or CESoPSN service packet in the designated service group. "Match" described in this embodiment refers to that: A difference is obtained by subtracting the reference sequence number from the sequence number of each SAToP or CESoPSN service packet, and an absolute value of the difference is less than a preset value, where, for example, the preset value may be 0.5.

Correspondingly, the acquiring an adjustment value for the asynchronous SAToP or CESoPSN service packet according to a preset rule, and adjusting the asynchronous SAToP or CESoPSN service packet according to the adjustment value includes:

acquiring a difference obtained by subtracting the reference sequence number from the sequence number of the asynchronous SAToP or CESoPSN service packet, and obtaining the adjustment value for the asynchronous SAToP or CESoPSN service according to the difference; and when the difference is a negative number, discarding a packet whose quantity is the adjustment value from the asynchronous SAToP or CESoPSN service packet; or when the difference is a positive number, inserting an idle packet whose quantity is the adjustment value to the asynchronous SAToP or CESoPSN service packet.

Optionally, the determining whether an asynchronous SAToP or CESoPSN service packet exists in the designated service group includes:

parsing each SAToP or CESoPSN service packet in the designated service group, to acquire timestamp information of each SAToP or CESoPSN service packet;

acquiring reference timestamp information according to the timestamp information of each SAToP or CESoPSN service packet; and determining whether the timestamp information of each SAToP or CESoPSN service packet matches with the reference timestamp information, and if not, determining a SAToP or CESoPSN service packet whose timestamp information does not match with the reference timestamp information as the asynchronous SAToP or CESoPSN service packet in the designated service group. "Match" described in this embodiment refers to that: A difference is obtained by subtracting the reference timestamp information from the timestamp information of each SAToP or CESoPSN service packet, and an absolute value of the difference is less than a preset value, where, for example, the preset value may be 0.5.

Correspondingly, the acquiring an adjustment value for the asynchronous SAToP or CESoPSN service packet according to a preset rule, and adjusting the asynchronous SAToP or CESoPSN service packet according to the adjustment value includes:

acquiring a difference obtained by subtracting the reference timestamp information from the timestamp information of the asynchronous SAToP or CESoPSN service packet, and obtaining the adjustment value for the asynchronous SAToP or CESoPSN service packet according to the difference; and when the difference is a positive number, discarding a packet whose quantity is the adjustment value from the asynchronous SAToP or CESoPSN service packet; or when the difference is a negative number, inserting an idle packet whose quantity is the adjustment value to the asynchronous SAToP or CESoPSN service packet.

The obtaining, by the first node device, the adjustment value for the asynchronous SAToP or CESoPSN service packet according to the difference includes: obtaining the adjustment value by converting the difference. A conversion method may be: dividing the difference by a transmission time interval of the single packet, and performing divisor processing on the calculation result according to a preset algorithm or rule, so as to obtain the adjustment value being an integer. The beneficial effects of this embodiment are: Multiple SAToP or CESoPSN service packets in a designated service group are managed together, which resolves a delay problem that occurs when a first node device sends the multiple SAToP or CESoPSN services.

Figure 9:
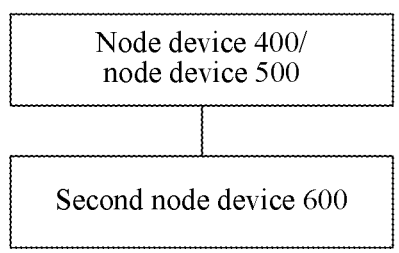
FIG. 9 is a schematic diagram of a data transmission system according to an embodiment of the present application.

Referring to FIG. 9, a data transmission system is further provided in an embodiment, including the node device 400 described in the foregoing embodiment or the node device 500 described in the foregoing embodiment and a second node device 600.

The second node device 600 is configured to bind multiple SAToP or CESoPSN service packets to the designated service group and send the designated service group to the node device 400 or the node device 500.

Figure 10:
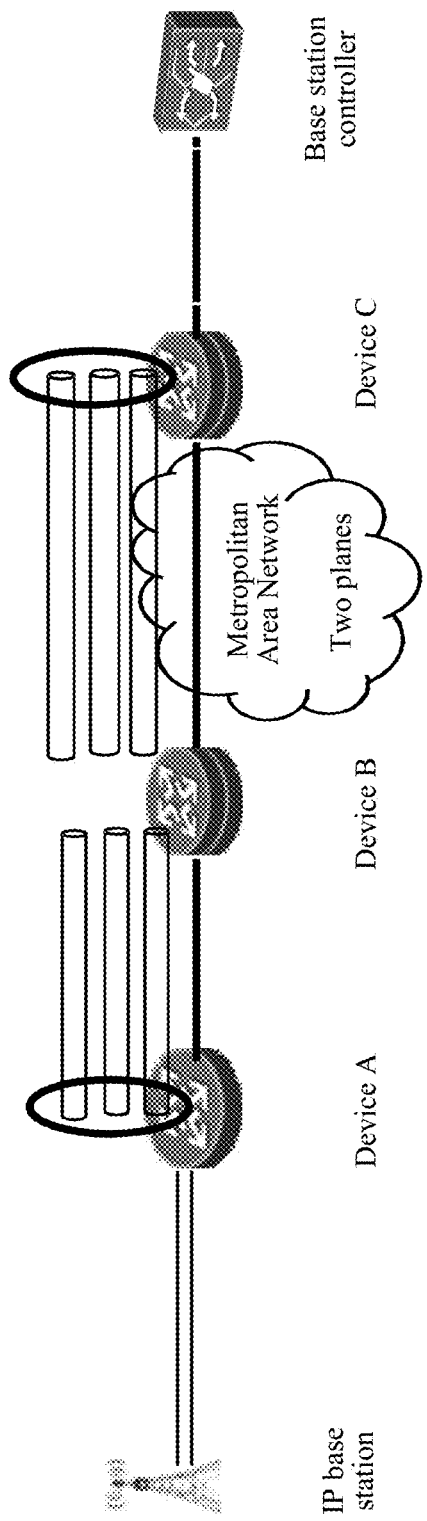
FIG. 10 is a schematic diagram of another data transmission system according to an embodiment of the present application.

In order to enable a person skilled in the art to understand the data transmission system provided in the present application more clearly, an example is given below:

Referring to FIG. 10, in a scenario of a SAToP or CESoPSN network, the data transmission system includes: an IP base station, device A, device B, device C, and a BSC. Multiple SAToP or CESoPSN service packets are bound to a designated service group for transmission. As shown in FIG. 10, it is assumed that three SAToP or CESoPSN service packets are bound to a service group for transmission. When data is transmitted from the IP base station to the BSC, a first node device is device C in the figure, and a second node device is device A. When data is transmitted from the BSC to the IP base station, a first node device is device A in the figure, and a second node device is device C. When data is transmitted from the IP base station to the BSC, and ML-PPP/IMA services are performed at two ends of both device A and device C, device A binds the three services to a service group and sends the service group to device C. When service packets temporarily stored in the C device reach a transmission pipeline, the temporarily stored packets are forwarded, and it is determined first whether three packets in the service group are synchronous before the packets are forwarded. If the three packets are asynchronous, synchronization adjustment is first performed on the three services according to sequence numbers or timestamp information of the packets, and then the packets are forwarded.

The beneficial effects of this embodiment are: Multiple SAToP or CESoPSN service packets in a designated service group are managed together, which resolves a delay problem that occurs when a first node device sends the multiple SAToP or CESoPSN services.

It should be noted that: for the node device provided in the foregoing embodiments, division of the foregoing functional modules is taken as an example for illustration. In actual application, the foregoing functions can be allocated to different functional modules and implemented according to a requirement, that is, an inner structure of a device is divided into different functional modules to implement all or some of the functions described above.

In addition, the node device and the data transmission system provided in the foregoing embodiments and the embodiments of the data transmission method belong to a same concept, and reference is made to the method embodiments for a specific implementation process of the node device and the data transmission system, which is not described herein again.

The sequence numbers of the foregoing embodiments of the present application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present application, but are not intended to limit the present application. Any modification, equivalent replacement, and improvement made without departing from the spirit and principle of the present application shall fall within the protection scope of the present application.

What is claimed is:

1. A data transmission method, wherein the method comprises:
    in response to receiving, by a first node device, multiple service packets of Structure-Agnostic Time Division Multiplexing over Packet (SAToP) or Structure-Aware Time Division Multiplexed Circuit Emulation Service over Packet Switched Network (CESoPSN) transmitted on multiple transmission links by a second node device to be bound to a designated service packet group, temporarily storing, by the first node device, the multiple service packets of the designated service packet group transmitted on the multiple transmission links by the second node device,
    wherein,
        the designated service packet group is used to manage sequence numbers of the SAToP or CESoPSN service packets in the designated service packet group; and
    in response to the first node device forwarding the multiple SAToP or CESoPSN service packets in the temporarily stored designated service packet group and a determination, by the first node device, that an asynchronous SAToP or CESoPSN service packet exists on a transmission link among the multiple transmission links in the designated service packet group,
        acquiring, by the first node device, an adjustment value for the transmission link transmitting the asynchronous SAToP or CESoPSN service packet according to a rule for the designated service packet group, and
        adjusting the transmission link transmitting the asynchronous SAToP or CESoPSN service packet according to the adjustment value, to cause the multiple SAToP or CESoPSN service packets in the designated service packet group be transmitted synchronously,
    wherein the determination, by the first node device, that the asynchronous SAToP or CESoPSN service packet exists in the designated service packet group comprises:
        parsing, by the first node device, at least one SAToP or CESoPSN service packet in the designated service packet group, to acquire a sequence number of the at least one SAToP or CESoPSN service packet in the designated service packet group;
        acquiring, by the first node device, a reference sequence number according to the sequence number of the SAToP or CESoPSN service packet in the designated service packet group; and
        determining, by the first node device, whether the sequence number of the least one SAToP or CESoPSN service packet matches the reference sequence number, and if not, determining the at least one SAToP or CESoPSN service packet which sequence number is different from the reference sequence number as the asynchronous SAToP or CESoPSN service packet that exists in the designated service packet group;
    wherein the acquiring, by the first node device, the adjustment value for the transmission link transmitting the asynchronous SAToP or CESoPSN service packet according to the rule for the designated service packet group, and adjusting the transmission link transmitting the asynchronous SAToP or CESoPSN service packet according to the adjustment value comprises:
        acquiring, by the first node device, a difference obtained by subtracting the reference sequence number from the sequence number of the asynchronous SAToP or CESoPSN service packet, and acquiring the adjustment value for the transmission link transmitting the asynchronous SAToP or CESoPSN service packet according to the difference; and
        to adjust the transmission link transmitting the asynchronous SAToP or CESoPSN service packet, when the difference is a negative number, discarding, by the first node device, an SAToP or CESoPSN service packet which quantity is the adjustment value from the asynchronous SAToP or CESoPSN service packet transmitted on the transmission link, or when the difference is a positive number, inserting, by the first node device, an idle SAToP or CESoPSN service packet which quantity is the adjustment value to the asynchronous SAToP or CESoPSN service packet transmitted on the transmission link.

2. A node device, comprising:

at least one computer readable storage medium to store at least one program; and at least one hardware processor to cause, including by execution of the at least one program, to implement a first node device among node devices to:

in response to receiving multiple service packets of Structure-Agnostic Time Division Multiplexing over Packet (SAToP) or Structure-Aware Time Division Multiplexed Circuit Emulation Service over Packet Switched Network (CESoPSN) transmitted on multiple transmission links by a second node device among the node devices to be bound to a designated service packet group, temporarily store the multiple service packets of designated service packet group transmitted on the multiple transmission links by the second node device, wherein the designated service packet group is used to manage sequence numbers of the SAToP or CESoPSN service packets in the designated service packet group; and in response to forwarding the multiple SAToP or CESoPSN service packets in the temporarily stored designated service packet group, and a determination that an asynchronous SAToP or CESoPSN service packet exists on a transmission link among the multiple transmission links in the designated service packet group, acquire an adjustment value for the transmission link transmitting the asynchronous SAToP or CESoPSN service packet according to a rule for the designated service packet group, and adjust the transmission link transmitting the asynchronous SAToP or CESoPSN service packet according to the adjustment value, to cause the multiple SAToP or CESoPSN service packets in the designated service packet group be transmitted synchronously, wherein the determination that the asynchronous SAToP or CESoPSN service packet exists in the designated service packet group comprises:

parsing at least one SAToP or CESoPSN service packet in the designated service group, to acquire a sequence number of the at least one SAToP or CESoPSN service packet in the designated service packet group;

acquiring a reference sequence number according to the sequence number of the at least one SAToP or CESoPSN service packet in the designated service packet group obtained through the parsing; and determining whether the sequence number of the at least one SAToP or CESoPSN service packet matches the reference sequence number, and if not, determine the at least one SAToP or CESoPSN service packet which sequence number is different from the reference sequence number as the asynchronous SAToP or CESoPSN service packet in the designated service group;

wherein the adjustment value for the transmission link transmitting the asynchronous SAToP or CESoPSN service packet is acquired and the asynchronous SAToP or CESoPSN service packet is adjusted by:

acquiring a difference obtained by subtracting the acquired reference sequence number from the sequence number of the asynchronous SAToP or CESoPSN service packet, and acquiring the adjustment value for the transmission link transmitting the asynchronous SAToP or CESoPSN service packet according to the difference; and to adjust the transmission link transmitting the asynchronous SAToP or CESoPSN service packet, when the difference is a negative number, discard an SAToP or CESoPSN service packet which quantity is the adjustment value from the asynchronous SAToP or CESoPSN service packet, or when the difference is a positive number, insert an idle SAToP or CESoPSN service packet which quantity is the adjustment value to the asynchronous SAToP or CESoPSN service packet transmitted on the transmission link.

3. A data transmission method, wherein the method comprises:

in response to receiving, by a first node device, multiple service packets of Structure-Agnostic Time Division Multiplexing over Packet (SAToP) or Structure-Aware Time Division Multiplexed Circuit Emulation Service over Packet Switched Network (CESoPSN) transmitted on multiple transmission links by a second node device to be bound to a designated service packet group, temporarily storing, by the first node device, the multiple service packets of the designated service packet group transmitted on the multiple transmission links by the second node device, wherein, the designated service packet group is used to manage timestamp information of the SAToP or CESoPSN service packets in the designated service packet group; and in response to the first node device forwarding the multiple SAToP or CESoPSN service packets in the temporarily stored designated service packet group, and a determination, by the first node device, that an asynchronous SAToP or CESoPSN service packet exists on a transmission link among the multiple transmission links in the designated service packet group, acquiring, by the first node device, an adjustment value for the transmission link transmitting the asynchronous SAToP or CESoPSN service packet according to a rule for the designated service packet group, and adjusting the transmission link transmitting the asynchronous SAToP or CESoPSN service packet according to the adjustment value, to cause the multiple SAToP or CESoPSN service packets in the designated service packet group be transmitted synchronously;

wherein the determination, by the first node device, that the asynchronous SAToP or CESoPSN service packet exists in the designated service packet group comprises:

parsing, by the first node device, at least one SAToP or CESoPSN service packet in the designated service packet group, to acquire information of a timestamp of the at least one SAToP or CESoPSN service packet in the designated service packet group;

acquiring, by the first node device, reference timestamp information according to the timestamp information of at least one SAToP or CESoPSN service packet in the designated service packet group; and determining, by the first node device, whether the timestamp information of the at least one SAToP or CESoPSN service packet matches with the reference timestamp information, and if not, determining the at least one SAToP or CESoPSN service packet which timestamp information is different from the reference timestamp information as the asynchronous SAToP or CESoPSN service packet that exists in the designated service packet group;

wherein the acquiring, by the first node device, the adjustment value for the transmission link transmitting the asynchronous SAToP or CESoPSN service packet according to the rule for the designated service packet group, and adjusting the transmission link transmitting the asynchronous SAToP or CESoPSN service packet according to the adjustment value comprises:

acquiring, by the first node device, a difference obtained by subtracting the reference timestamp information from the timestamp information of the asynchronous SAToP or CESoPSN service packet, and acquiring the adjustment value for the transmission link transmitting the asynchronous SAToP or CESoPSN service packet according to the difference; and to adjust the transmission link transmitting the asynchronous SAToP or CESoPSN service packet, when the difference is a positive number, discarding, by the first node device, an SAToP or CESoPSN service packet which quantity is the adjustment value from the asynchronous SAToP or CESoPSN service packet transmitted on the transmission link, or when the difference is a negative number, inserting, by the first node device, an idle SAToP or CESoPSN service packet which quantity is the adjustment value to the asynchronous SAToP or CESoPSN service packet transmitted on the transmission link.

4. A node device, comprising:

at least one computer readable storage medium to store at least one program; and at least one hardware processor to cause, including by execution of the at least one program, to implement a first node device among node devices to:

in response to receiving multiple service packets of Structure-Agnostic Time Division Multiplexing over Packet (SAToP) or Structure-Aware Time Division Multiplexed Circuit Emulation Service over Packet Switched Network (CESoPSN) transmitted on multiple transmission links by a second node device among the node devices to be bound to a designated service packet group, temporarily store the multiple service packets of designated service packet group transmitted on the multiple transmission links by the second node device, wherein the designated service packet group is used to manage timestamp information of the SAToP or CESoPSN service packets in the designated service packet group; and in response to forwarding the multiple SAToP or CESoPSN service packets in the temporarily stored designated service packet group, and a determination that an asynchronous SAToP or CESoPSN service packet exists on a transmission link among the multiple transmission links in the designated service packet group, acquire an adjustment value for the transmission link transmitting the asynchronous SAToP or CESoPSN service packet according to a rule for the designated service packet group, and adjust the transmission link transmitting the asynchronous SAToP or CESoPSN service packet according to the adjustment value, to cause the multiple SAToP or CESoPSN service packets in the designated service packet group be transmitted synchronously;

wherein the determination that the asynchronous SAToP or CESoPSN service packet exists in the designated service packet group comprises:

parsing at least one SAToP or CESoPSN service packet in the designated service group, to acquire a timestamp information of the at least one SAToP or CESoPSN service packet in the designated service packet group;

acquiring reference timestamp information according to the timestamp information of the at least one SAToP or CESoPSN service packet in the designated service packet group acquired by the parsing; and determining whether the timestamp information of the at least one SAToP or CESoPSN service packet matches the reference timestamp information, and if not, determine the at least one SAToP or CESoPSN service packet which timestamp information is different from the reference timestamp information as the asynchronous SAToP or CESoPSN service packet in the designated service group;

wherein the adjustment value for the transmission link transmitting the asynchronous SAToP or CESoPSN service packet is acquired and the asynchronous SAToP or CESoPSN service packet is adjusted by:

acquiring a difference obtained by subtracting the reference timestamp information from the timestamp information of the asynchronous SAToP or CESoPSN service packet, and acquiring the adjustment value for the transmission link transmitting the asynchronous SAToP or CESoPSN service according to the difference; and to adjust the transmission link transmitting the asynchronous SAToP or CESoPSN service packet, when the difference is a positive number, discard an SAToP or CESoPSN service packet which quantity is the adjustment value from the asynchronous SAToP or CESoPSN service packet, or when the difference is a negative number, insert an idle SAToP or CESoPSN service packet which quantity is the adjustment value to the asynchronous SAToP or CESoPSN service packet transmitted on the transmission link.

* * * * *